May 4, 1948. E. J. CARLSON 2,441,109
SPIRAL STAKE
Filed Nov. 12, 1940 3 Sheets-Sheet 1
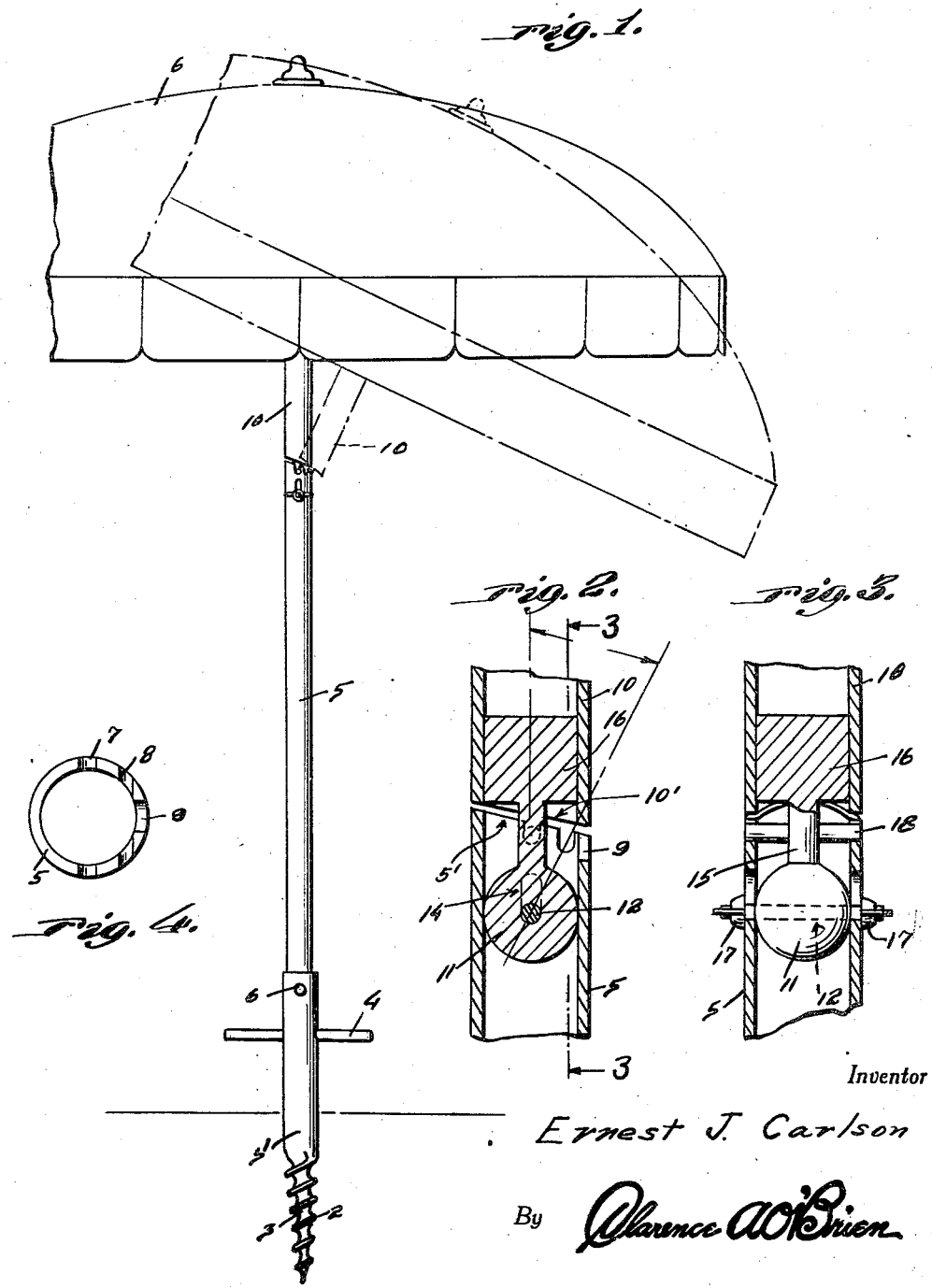
Inventor
Ernest J. Carlson
By Clarence A. O'Brien
Attorney

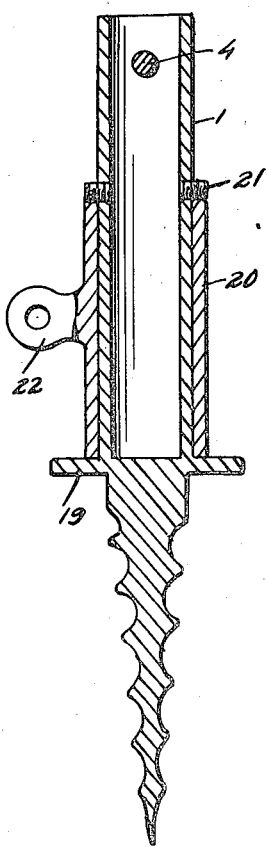
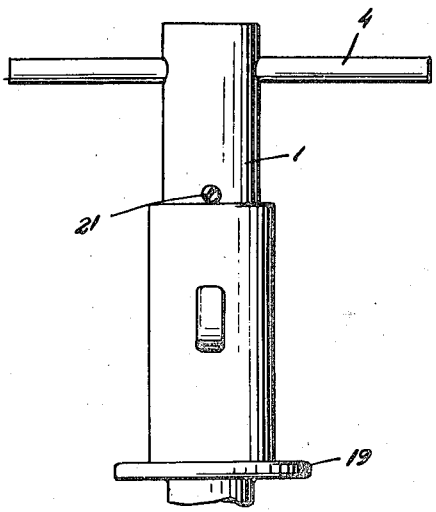
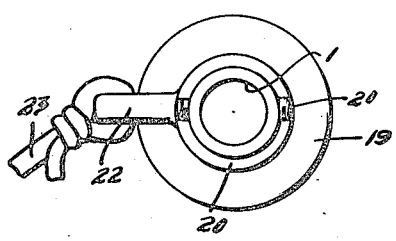
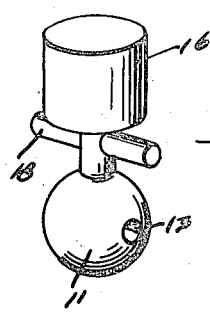

May 4, 1948. E. J. CARLSON 2,441,109
SPIRAL STAKE
Filed Nov. 12, 1940 3 Sheets-Sheet 3
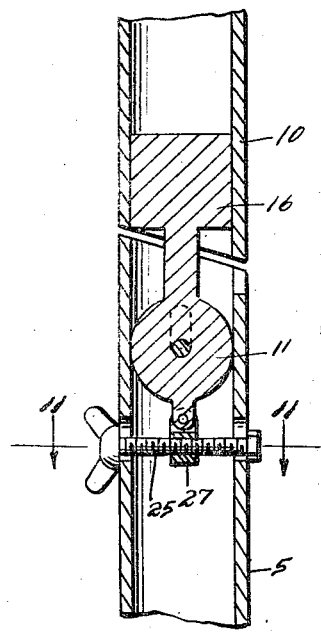
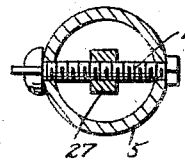
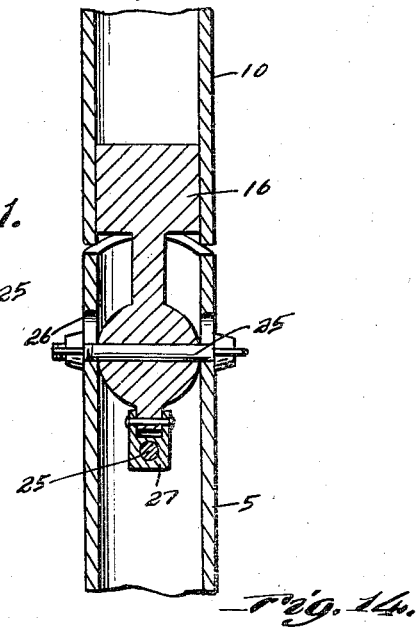
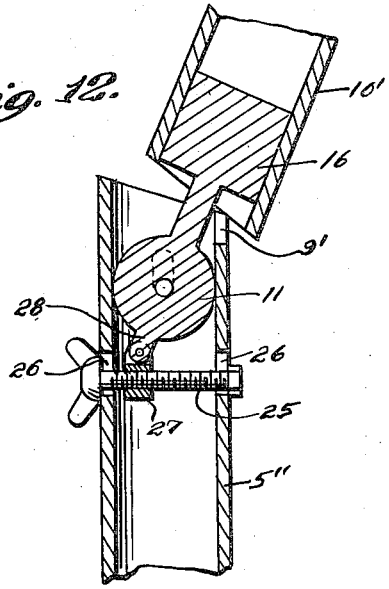
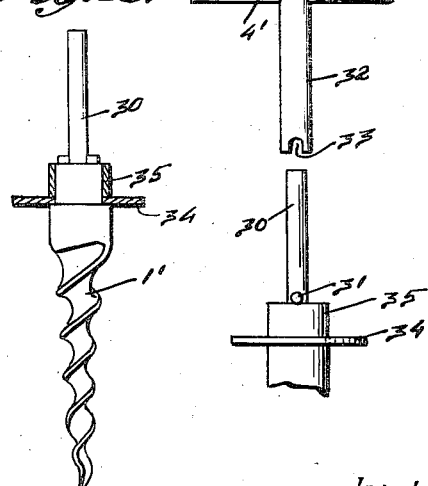
Inventor
Ernest J. Carlson
By Clarence A. O'Brien
Attorney Patented May 4, 1948

2,441,109

UNITED STATES PATENT OFFICE 2,441,109

SPIRAL STAKE

Ernest J. Carlson, Reading, Pa.

Application November 12, 1940, Serial No. 365,357

Section 3, Public Law 690, August 8, 1946
Patent expires November 12, 1960

4 Claims. (Cl. 287—99)

This invention relates to a spiral stake, the general object of the invention being to provide a stake having a spirally grooved point for penetrating the ground, with a removable handle for rotating the stake to cause the point to engage the ground or to remove the stake from the ground, with means whereby cattle can be tied to the stake by a rope in such a manner that there is no danger of the rope or other fastening means becoming wrapped around the stake and with means for supporting, in different positions, lawn or beach umbrellas from the stake.

This stake can also be used for anchoring wooden planks of amusement stands, etc., at carnivals, fairs and other events of this nature, for anchoring movable fences, for staking down tents, for use in making foundations of pile piers by attaching the stakes to end of pipes etc. acting as a scaffold or support for cement operations, for supporting of fishing rods in surf-fishing and for other uses.

Another object of the invention is to provide means whereby the stake can be used as a quoiting pin.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view showing the stake in use for supporting an umbrella, this view showing the umbrella in two different positions in full and dotted lines.

Figure 2 is a fragmentary vertical sectional view showing the means for adjusting the standard of the umbrella in different positions.

Figure 3 is a section on the line 3—3 of Figure 2.

Figure 4 is a top plan view of the lower section of the umbrella standard.

Figure 5 is a view of the member which joins the two sections of the standard together.

Figure 6 is a sectional view showing the stake used for tying cattle thereto by a cable or rope.

Figure 7 is a view of the upper portion of the stake with the rotary sleeve removed therefrom.

Figure 8 is a top plan view of the stake shown in Figure 6 with the cable attached to the rotary sleeve.

Figure 9 is a fragmentary vertical sectional view showing a modification of the device shown in Figure 1.

Figure 10 is a similar view but taken a quarter turn from the view shown in Figure 9.

Figure 11 is a section on the line 11—11 of Figure 9.

Figure 12 is a view similar to Figure 9 but showing the upper section in an inclined position.

Figure 13 is a view of the stake used as a quoit pin.

Figure 14 is a view showing the handle member for turning the quoit pin.

As shown in these views the stake comprises a body 1 having a pointed part 2 which is formed with a spiral groove 3 so that by rotating the stake the same can be readily caused to enter the ground when turned in one direction and when turned in an opposite direction the stake can be readily removed from the ground. The body 1 is of tubular construction and has oppositely arranged holes therein for receiving a handle bar 4 so that the stake can be readily turned and this bar can be removed whenever desired.

A standard 5 of an umbrella 6 can be inserted into the tubular body of the stake to hold the umbrella and the lower end of the standard may be fastened in the body by a fastening member 6. The upper end of the main part of the standard has a sloping upper end as shown at 5' and this upper end is formed with the two pairs of diametrically opposite notches 7 and 8 and a large notch 9 which is placed at right angles to the notches 7. The umbrella is attached to a section 10 of the standard which has its lower end sloping as shown at 10'. A spherical member 11 is slidably supported in the upper end of the main section of the standard by a pin 12 passing through a diametrical hole 13 in the spherical member 11 and through vertical slots 14 in the upper end of the main part of the standard. A short shank 15 extends upwardly from the spherical member and is connected with a plug 16 which is fastened in the lower end of the section 10. The outer ends of the member 12 are screw-threaded to receive the nuts 17 for holding the spherical member in adjusted position and a rod 18 passes through the shank 15 or is formed therewith, this rod having its ends adapted to engage the notches 7 and 8 to hold the section 10 and the umbrella in either the full line position shown in Figure 1 or the dotted line position shown in said figure, the rod 18 being placed in the desired one of the pair of notches by raising the spherical member to place the rod 18 over the notches and then lowering the device to cause the ends of the rod 18 to engage the notches. After this is done the nut 17 is tightened to hold the parts in adjusted position.

In Figures 6, 7 and 8, a flange 19 is formed on the body and a sleeve 20 is rotatably placed on the body and has one end engaging the flange 19 and screws 21 are threaded in holes in the body to hold the sleeve in place. A perforated ear 22 projects from a side part of the sleeve so that a rope or other fastening member 23 can be attached thereto, as shown in Figure 8, to stake out a cow, horse or other livestock without danger of the fastening member becoming wrapped around the same.

Figures 9, 10, 11 and 12, show a modification of the type shown in Figure 1 and as shown in these figures a screw bolt 25 passes through slots 26 in the main part of the standard 5" and this screw bolt passes through a nut 27 pivoted to an ear 28 depending from the spherical member 11' so that by turning the screw bolt the spherical member can be adjusted to hold the section 10' of the umbrella to either a vertical position or in a sloping position as shown in Figures 9, 10 and 12.

The notch 9 or 9' permits passage of the shank 15 so as to enable the upper section of the standard to be placed in a greater inclination than it could if this notch was not provided.

Figures 13 and 14 show the body 1' provided with a spiral point as supporting a pin 30 for the playing of horseshoes or quoits and in this case a small pin 31 extends through the base of the pin 30 and the handle 4' passes through a tubular part 32 which is adapted to be placed over the pin 30 with notches 33 in the ends of the part 32 for engaging the pin 31 so that the stake can be turned to cause it to penetrate the ground or to remove the stake from the ground. A flange 34 is carried by the upper part of the stake for engaging the ground and this flange or washer is carried by a collar 35 which fits over the reduced upper end of the body as shown.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a standard formed of two tubular sections, a spherical member in one end of one section and adjustably supported therein, a plug in the adjacent end of the other section, a neck connecting the plug with the spherical member, said adjacent ends being sloping and means for holding the parts in adjusted position.

2. In a device of the class described, a standard formed of two tubular sections, a spherical member in one end of one section and adjustably supported therein, a plug in the adjacent end of the other section, a neck connecting the plug with the spherical member, said adjacent ends being sloping and means for holding the parts in adjusted position, said means including a nut depending from the spherical member and pivotally connected therewith and a screw bolt passing through a section and through the nut.

3. In a device of the class described, a standard including two sections, the adjacent ends of the sections sloping from one side to the other and the upper end of the lower section having notches therein, a spherical member adjustably arranged in the upper end of the lower section, a shank extending upwardly from the spherical member, a plug in the adjacent end of the top section and connected with the shank, a pin carried by the shank for engaging certain ones of the notches to hold the parts in adjusted position and a bolt passing through the spherical member and the upper end of the lower section.

4. In a device of the class described, a pair of members having their adjacent ends sloping to permit one member to be moved from a position where it is in longitudinal alignment with the other member to an inclined position to said other member, a shank extending from the end of one member, a spherical member on the free end of the shank, means for slidably supporting the spherical member in the other member, for movement toward and away from said adjacent end of the other member, means for holding the spherical member in adjusted position, said end of the other member having notches therein and a pin carried by the shank for engaging selected one of the notches for holding the first member in an inclined position or in a position extending in longitudinal alignment with the other member.

ERNEST J. CARLSON.

REFERENCES CITED

The following references are of record in the file of this patent:

UNITED STATES PATENTS

| Number | Name | Date |
|---|---|---|
| 1,736,177 | Snook | Nov. 19, 1929 |
| 2,168,830 | Schroth | Aug. 8, 1939 |
| 2,209,504 | Beiter | July 30, 1940 |
| 2,211,283 | Mercer | Aug. 13, 1940 |